US006035194A

United States Patent [19]
Mattila

[11] Patent Number: 6,035,194
[45] Date of Patent: Mar. 7, 2000

[54] METHODS AND APPARATUS FOR RESOLVING DCCH TO ACC TRANSITION REGISTRATION CONFLICTS IN A MOBILE STATION

[75] Inventor: Ilpo Mattila, Ruukki, Finland

[73] Assignee: Nokia Mobile Phones Limited, Espoo, Finland

[21] Appl. No.: 09/061,747

[22] Filed: Apr. 16, 1998

Related U.S. Application Data

[60] Provisional application No. 60/048,413, Jun. 3, 1997.

[51] Int. Cl.[7] .................................................... H04Q 7/20
[52] U.S. Cl. ........................... 455/434; 455/435; 455/515
[58] Field of Search ................................... 455/434, 515, 455/450, 451, 452, 62, 455, 432, 435; 370/329, 341, 348

[56] References Cited

U.S. PATENT DOCUMENTS

| 5,903,839 | 5/1999 | Mattila | 455/434 |
| 5,953,665 | 9/1999 | Mattila | 455/434 |

*Primary Examiner*—Lee Nguyen
*Attorney, Agent, or Firm*—Ohlandt, Greeley, Ruggiero & Perle, L.L.P.

[57] ABSTRACT

A method is disclosed for operating a mobile station (10), including the steps of, after registering with a first system and camping on a control channel of the first system, (a) leaving the control channel of the first system and sending a registration request to a second system; (b) determining if a registration response is received from the second system; and, if the registration response is not received from the second system, (c) setting a flag. The method further includes the steps of (d) locating a control channel of the first system; (e) testing the state of the flag to determine if it is set; and, if the flag is set, (f) sending a registration request to the first system. In one embodiment of this invention the first system is a digital system, and the second system is an analog system. In another embodiment of this invention the first system is a digital system, and the second system is a digital system, while in a further embodiment the first system is an analog system, and the second system is a digital system. Also, in one case the registration response is a Registration Order Confirmation, while in another case the registration response is one of a Registration Accept or a Registration Reject. In an IS-136 embodiment of this invention the flag being set is used to trigger an ACC to DCCH Transition Condition, or a Hyperband Transition Condition, when in the DCCH Camping state, and thus causes the Registration procedure to be invoked.

15 Claims, 3 Drawing Sheets

METHODS AND APPARATUS FOR RESOLVING DCCH TO ACC TRANSITION REGISTRATION CONFLICTS IN A MOBILE STATION

CLAIM OF PRIORITY FROM A COPENDING PROVISIONAL PATENT APPLICATION

Priority is herewith claimed under 35 U.S.C. §119(e) from copending Provisional Patent Application 60/048,413, filed Jun. 3, 1997, entitled "Method and Apparatus for Resolving DCCH to ACC Transition Registration Conflicts in a Mobile Station", by Ilpo Mattila. The disclosure of this Provisional Patent Application is incorporated by reference herein in its entirety.

FIELD OF THE INVENTION

This invention relates generally to radiotelephones and, in particular, to radiotelephones or mobile stations such as those capable of operation with a cellular network.

BACKGROUND OF THE INVENTION

A multimode mobile station, such as a radiotelephone or personal communicator, is capable of operating in more than one system. By example, and for a dual mode mobile station, the modes may be a digital cellular mode (e.g., GSM or DCS1900) and an analog (FM) cellular mode (e.g., IS-41 (AMPS)).

One such modern cellular system is referred to as IS-136, which is described in IS-136.1 and IS-136.2, Rev. A, February 1996, and subsequent updated releases. This system employs both Digital Control Channels (DCCHs) and Analog Control Channels (ACCS) that enable a mobile station to gain access to the system. When a mobile station scans for and subsequently monitors a DCCH or a ACC, it is said to be "camped" on that particular DCCH or ACC. Page messages and other information are received from the DCCH or ACC.

When a currently registered mobile station is performing a Registration on a new system (DCCH to ACC, Public System Identification (SID), Private System Identification (PSID), Residential System Identification (RSID), etc), IS-136 currently has a deficiency that may result in the mobile station being "cutoff" from any system. The nature of this deficiency is best understood with the following example.

A mobile station that is camped on a DCCH transmits a Registration message to the new system, for example a system having an ACC. The new system receives and processes the Registration message, and executes VLR/HLR updates, if necessary. The new system then transmits an Order Confirmation message to the mobile station over the ACC.

However, due to some RF coverage problem (e.g., the user enters an elevator or a tunnel), the mobile station does not successfully receive the Order Confirmation message. In this case it may happen (depending on circumstances) that after the RF reception conditions improve the mobile station may revert back to the original DCCH of the first system (DCCH). It may also occur that the mobile station may again find the same or a different ACC, and would again attempt to register on the ACC since the previous attempt failed. In the most common case, the mobile station will locate and access another control channel (DCCH) of the first system. Reference can be had to, by example, IS-136.2, Section 2.6.3.10, Action on Registration Failure.

However, the mobile station will consider itself to be still registered with the original system (the attempted registration on the second system did not succeed from the mobile stations's perspective, and the last successful registration was with the original system). In this case the mobile station resumes camping on the DCCH of the original (first) system.

The problem that results is that the mobile station does not receive any pages, as they are sent by the new system (ACC) to which the mobile station (unknowingly) successfully registered. As presently specified, corrective action can take anywhere from 1 minute to 8.5 hours (in one minute increments), with a typical time being between 10 minutes and one hour. During this time the mobile station is effectively cut-off from service, and may miss an important incoming call.

OBJECTS OF THE INVENTION

It is thus a first object of this invention to provide an improved method for registering a mobile station with a new system, to insure against an inadvertent loss of service.

It is a further object of this invention to provide a mobile station that includes a capability to trigger an ACC to DCCH Transition Condition when it returns to a Camping State on a DCCH, wherein the mobile station views a successful Registration Access, without a subsequent Order Confirmation, as a successful registration on the ACC, and thus requires the mobile station to register, with an ACC to DCCH Indication, with the original system.

SUMMARY OF THE INVENTION

The foregoing and other problems are overcome and the objects of the invention are realized by methods and apparatus in accordance with embodiments of this invention.

A method is disclosed for operating a mobile station, the method including the steps of, after registering with a first system and camping on a control channel of the first system, (a) leaving the control channel of the first system and sending a registration request to a second system; (b) determining if a registration response is received from the second system; and, if the registration response is not received from the second system, (c) setting a flag. The method further includes the steps of (d) locating a control channel of the first system; (e) testing the state of the flag to determine if it is set; and, if the flag is set, (f) sending a registration request to the first system.

In one embodiment of this invention the first system is a digital system, and the second system is an analog system. In another embodiment of this invention the first system is a digital system, and the second system is a digital system, while in a further embodiment the first system is an analog system, and the second system is a digital system. Also, in one case the registration response is a Registration Order Confirmation, while in another case the registration response is one of a Registration Accept or a Registration Reject.

In an IS-136 embodiment of this invention the flag being set is used to trigger an ACC to DCCH Transition Condition, or a Hyperband Transition Condition, when in the DCCH Camping state, and thus causes the Registration procedure to be invoked. The flag being set can also cause the mobile station to initiate an autonomous registration and to enter the System Access Task with a Registration indication, when operating on an ACC.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
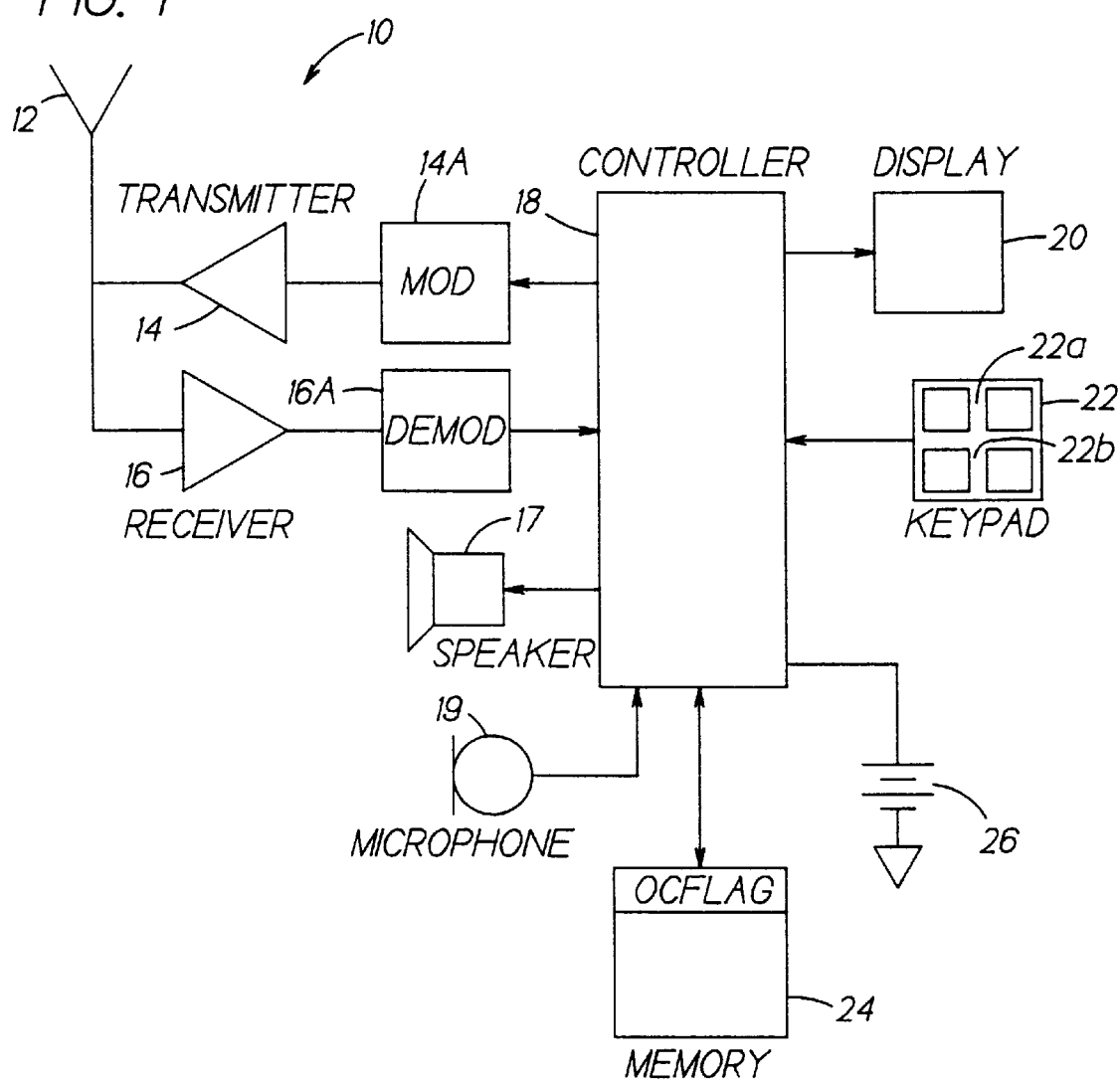
FIG. 1 is a block diagram of a mobile station that is constructed and operated in accordance with this invention.
Figure 2:
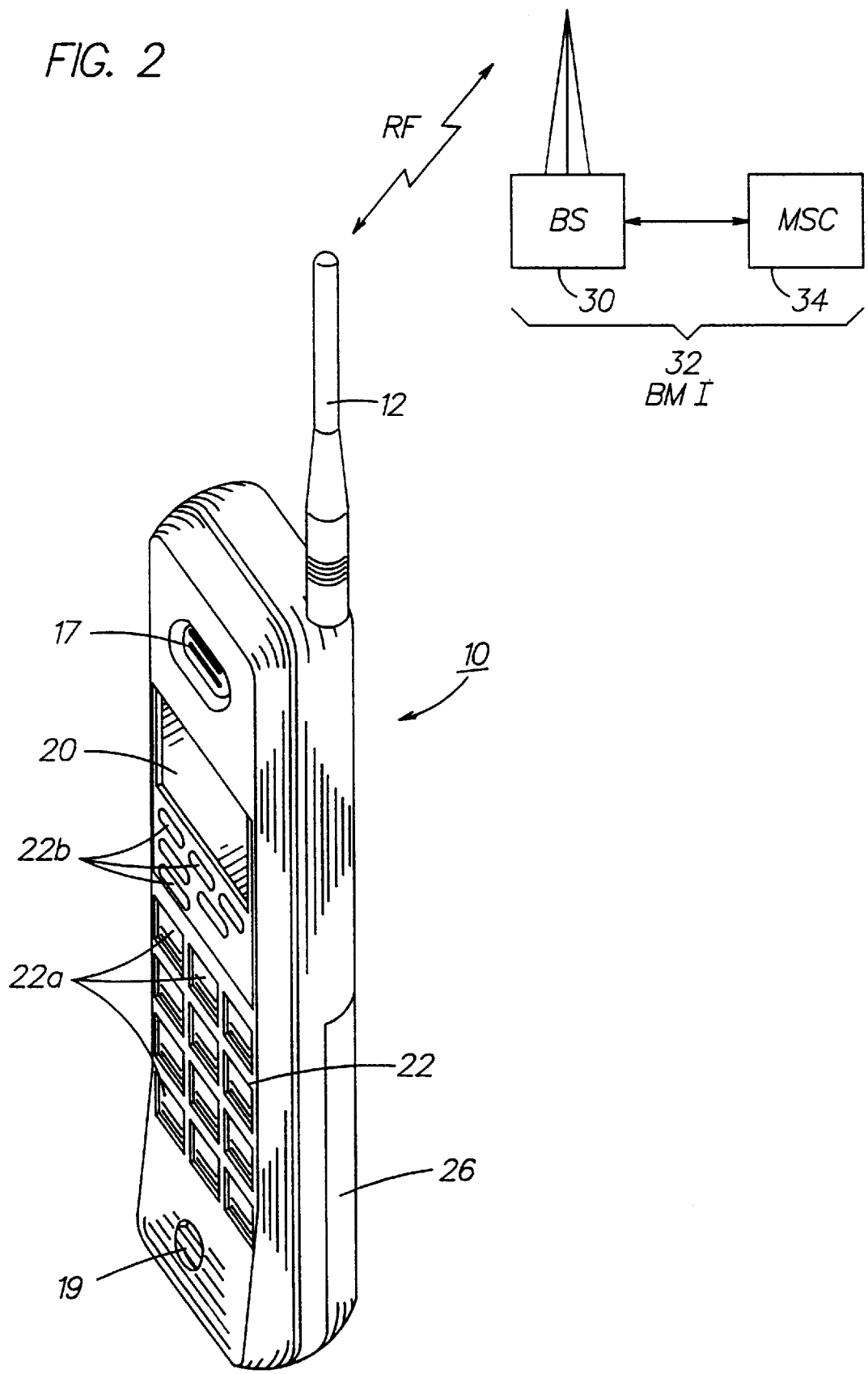
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 can be a vehicle mounted or a handheld device. The mobile station 10 includes an antenna 12 for transmitting signals to and for receiving signals from a base site or base station 30. The base station 30 is a part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call.

For the illustrated example the mobile station 10 is assumed to be compatible with the IS-136 air interface, but this is not a limitation on the practice of this invention. For the IS-136 case the BMI 32 is assumed to be capable of servicing two systems, i.e., a digital system comprised of at least digital control and traffic channels, and an analog system comprised of at least an analog control and traffic channels. In other embodiments different BMIs may service the different system types, with roaming being permitted between the systems.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. For the purposes of this invention the transmitter, receiver, modulator and demodulator are all considered to be dual-mode capable, and can operate with the frequencies, modulation type, access type, etc. of both digital and analog systems, or two different types of digital systems. It should thus be clear that the teaching of this invention is not to be construed to be limited to any one particular type of mobile station or air interface standard.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

The operating program in the memory 24 includes routines to present messages and message-related functions to the user on the display 20, typically as various menu items. The memory 24 also includes routines for implementing the method described below in relation to FIG. 3.

Figure 3:
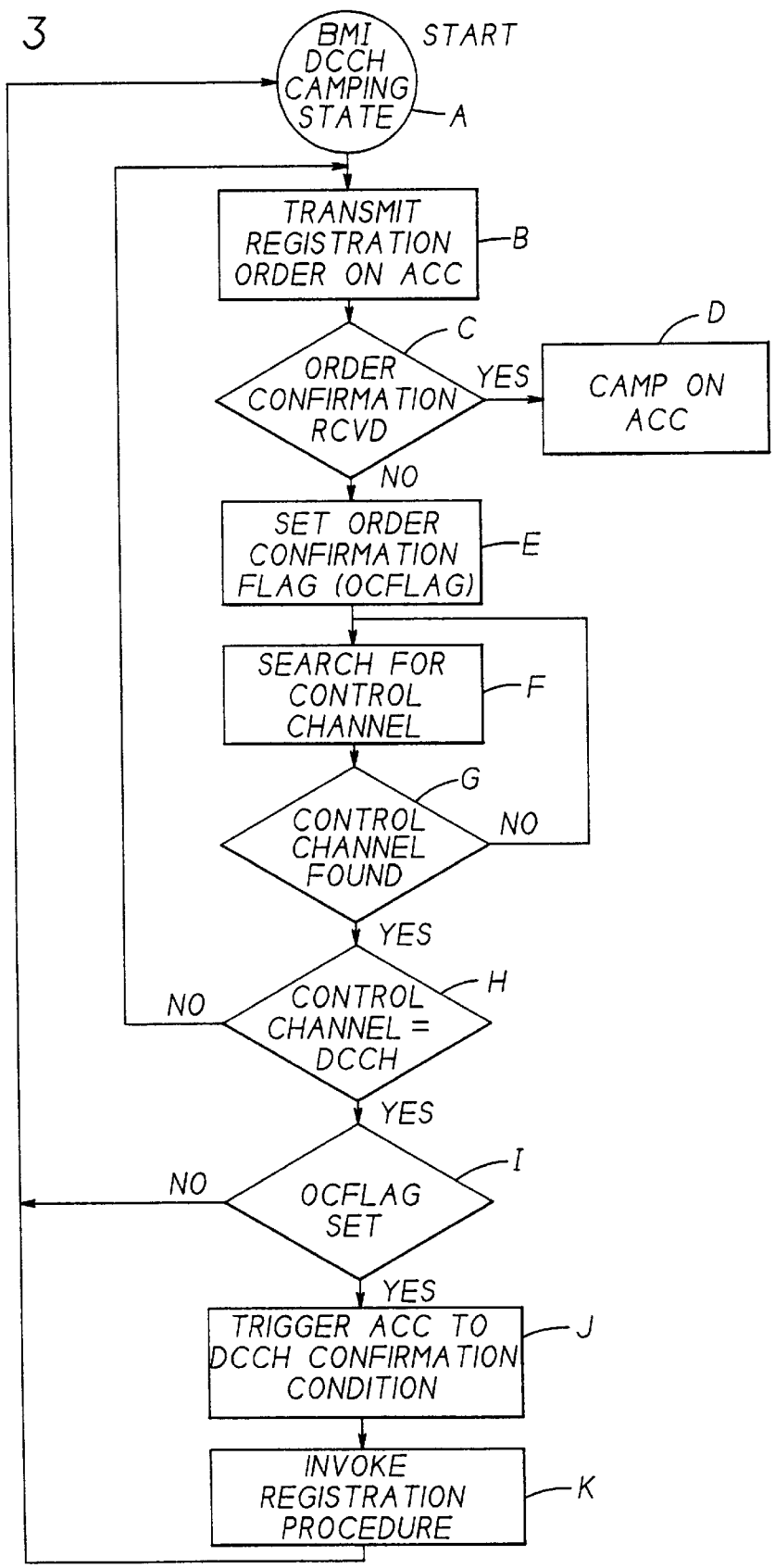
FIG. 3 is a logic flow diagram illustrating an embodiment of a method executed by the mobile station of FIGS. 1 and 2.

Reference is now made to FIG. 3 for illustrating a method in accordance with this invention. At Block A the mobile station 10 is assumed to have previously registered with the BMI 32 and to be in the first system in a DCCH camping state (IS-136.1, Section 6.2.3). At Block B the mobile station 10 re-tunes the transmitter 14 and receiver 16 and transmits a Registration Order to the second system using the ACC.

In this regard it is noted that the ACC and DCCH can be control channels of the same system (e.g., one SID), or they may be control channels of two different systems (e.g., two SIDs). As such, as employed herein the terms "first system" and "second system" are to be read to encompass both of these cases, as the teachings of this invention apply equally to both of these cases.

At Block C the mobile station 10 makes a determination if a Registration Order Confirmation message is received from the second system within some interval of time. If the Order Confirmation message is received, then control passes to Block D, where the mobile station 10 camps on the ACC in a conventional manner. However, if it is determined at Block C that the Order Confirmation message is not received by the mobile station 10 (even though it may have been transmitted by the second system), control passes instead to Block E where the mobile station 10 sets an Order Confirmation flag (OCFLAG) in the memory 24. The mobile station 10 then enters a procedure to search for a control channel (Block F), and when one is found (Block G), makes a determination if the control channel is a digital control channel (Block H). If the control channel is not a DCCH (that is, the control channel is an analog control channel), control passes back to Block B to transmit a Registration Order on the newly acquired ACC. However, if the new control channel is a DCCH, control passes instead to Block I.

At Block I, while in the DCCH Camping State (IS-136.1, Section 6.2.3, DCCH Camping State (D3)), the mobile station 10 makes a determination if one of a number of transition conditions exist. Of most interest to this embodiment of the invention is an ACC to DCCH Transition Condition. This condition exists, conventionally, whenever the mobile station 10 is attempting to acquire service on a DCCH, and its last successful registration was on an ACC, during the current power cycle.

In accordance with this embodiment of the invention the ACC to DCCH Transition Condition is modified to also include a determination of whether the mobile station 10 successfully transmitted a Registration Order on the ACC, but did not receive the Order Confirmation. This condition is reflected in the state of the OCFLAG, which was previously set at Block E. As such, at Block I the mobile station 10 makes a determination if the OCFLAG is set. If No, the condition is not fulfilled, and control passes back to Block A, where the mobile station 10 remains in the DCCH camping state. However, if Yes at Block I (the OCFLAG is set), the mobile station 10 triggers the ACC to DCCH Confirmation Condition at Block J, and invokes the DCCH Registration Procedure (Section 6.3.7) to (re-)register with the first system at Block K. Control then passes to the DCCH camping state of Block A.

By registering with the first system of the BMI, any page and other messages to the mobile station 10 are not sent over the ACC, where the mobile station 10 was believed to be camped, but are instead sent over the DCCH of the first system of the BMI 32. In this manner the mobile station 10 is not cut-off from system service, except for normal time required to execute Blocks E–K of FIG. 3.

Although described in the context of an attempted registration on the ACC, it is within the scope of this invention to apply these teachings as well to the Hyperband Transition Condition of the DCCH Camping State (D3) (Section 6.2.3), and to thus provide a separate flag (e.g., HBFLAG) to indicate that the mobile station 10 successfully transmitted a Registration message but did not receive a Registration Accept or a Registration Reject message from the different Hyperband. The method shown in the flowchart of FIG. 3 is thus modified accordingly. In general, a Hyperband refers to the other band in a dual-band system. By example, in the dual-band DAMPS system, and if the mobile station is registered in the 800 MHz band, then the 1900 MHz band may be referred to as the Hyperband, and vice versa. The teaching of this invention also applies to cases of mobile station-perceived unsuccessful registration attempts with different SIDs, RSIDs and PSIDs.

Further in accordance with the teachings of this invention, the Response to Overhead Information state (IS-136.2, Section 2.6.2.1) may also be modified such that if the mobile station's last successful registration was on an analog control channel, and the mobile station successfully transmitted a Registration Message but did not receive a Registration Accept or Registration Reject from a DCCH immediately prior to acquiring service on the current ACC, it initiates an autonomous registration (transition registration) by entering the System Access task (see IS-136.2, Section 2.6.3) with a Registration indication. Another flag in the memory 24 can be used (or re-used) for this purpose.

Although described in the context of preferred embodiments, it should be realized that a number of modifications to these teachings may occur to one skilled in the art. Thus, while the invention has been particularly shown and described with respect to preferred embodiments thereof, it should be understood that changes in form and details may be made therein without departing from the scope and spirit of the invention.

What is claimed is:

1. A method for operating a mobile station, comprising the steps of:

after registering with a first system and camping on a control channel of the first system, leaving the control channel of the first system and sending a registration request to a second system;

determining if a registration response is received from the second system;

if the registration response is not received from the second system, setting a flag;

accessing a control channel of the first system;

testing the state of the flag to determine if it is set; and if the flag is set, sending a registration request to the first system.

2. A method as in claim 1, wherein the first system is a digital system, and wherein the second system is an analog system.

3. A method as in claim 1, wherein the first system is a digital system, and wherein the second system is a digital system.

4. A method as in claim 1, wherein the first system is an analog system, and wherein the second system is a digital system.

5. A method as in claim 1, wherein the registration response is a Registration Order Confirmation.

6. A method as in claim 1, wherein the registration response is one of a Registration Accept or a Registration Reject.

7. A method for operating a mobile station, comprising the steps of:

after registering with a first system and camping on a digital control channel (DCCH) of the first system, leaving the DCCH of the first system and sending a Registration Order message to a second system;

determining if a Registration Order Confirmation message is received from the second system;

if the Registration Order Confirmation message is not received from the second system, setting a flag;

locating a DCCH of the first system;

testing the state of the flag to determine if it is set;

if the flag is set, triggering an analog control channel (ACC) to DCCH Transition Condition; and invoking a Registration procedure with the first system.

8. A method for operating a mobile station, comprising the steps of:

after registering with a digital system and camping on a digital control channel (DCCH) of the digital system, sending a Registration message in a different Hyperband;

determining if a Registration Accept message or a Registration Reject message is received in the different Hyperband;

if the Registration Accept message or the Registration Reject message is not received from the different Hyperband, setting a flag;

locating a DCCH of the digital system;

testing the state of the flag to determine if it is set;

if the flag is set, triggering a Hyperband Transition Condition; and invoking a Registration procedure with the digital system.

9. A mobile station, comprising:

a tunable RF transceiver;

a memory; and a controller coupled to said tunable transceiver and said memory, said controller operating in accordance with a program stored in said memory for registering with a first system and camping on a control channel of the first system, for re-tuning the transceiver and transmitting a registration request to a second system, said controller further determining if a registration response is received from the second system through said transceiver, said controller being responsive to a non-receipt of the registration response for setting a flag in said memory, for tuning said transceiver to a control channel of the first system, for accessing said memory to test the state of said flag to determine if it is set and, if said flag is determined to be set, for transmitting a registration request to the first system using said transceiver.

10. A mobile station as in claim 9, wherein the first system is a digital system, and wherein the second system is an analog system.

11. A mobile station as in claim 9, wherein the first system is a digital system, and wherein the second system is a digital system.

12. A mobile station as in claim 9, wherein the first system is an analog system, and wherein the second system is a digital system.

13. A mobile station as in claim 9, wherein the registration response is a Registration Order Confirmation.

14. A mobile station as in claim 9, wherein the registration response is one of a Registration Accept or a Registration Reject.

15. A mobile station as in claim 14, wherein the controller is responsive to the flag being set for initiating an autonomous registration and entering a System Access Task with a Registration indication.

* * * * *